UNITED STATES PATENT OFFICE.

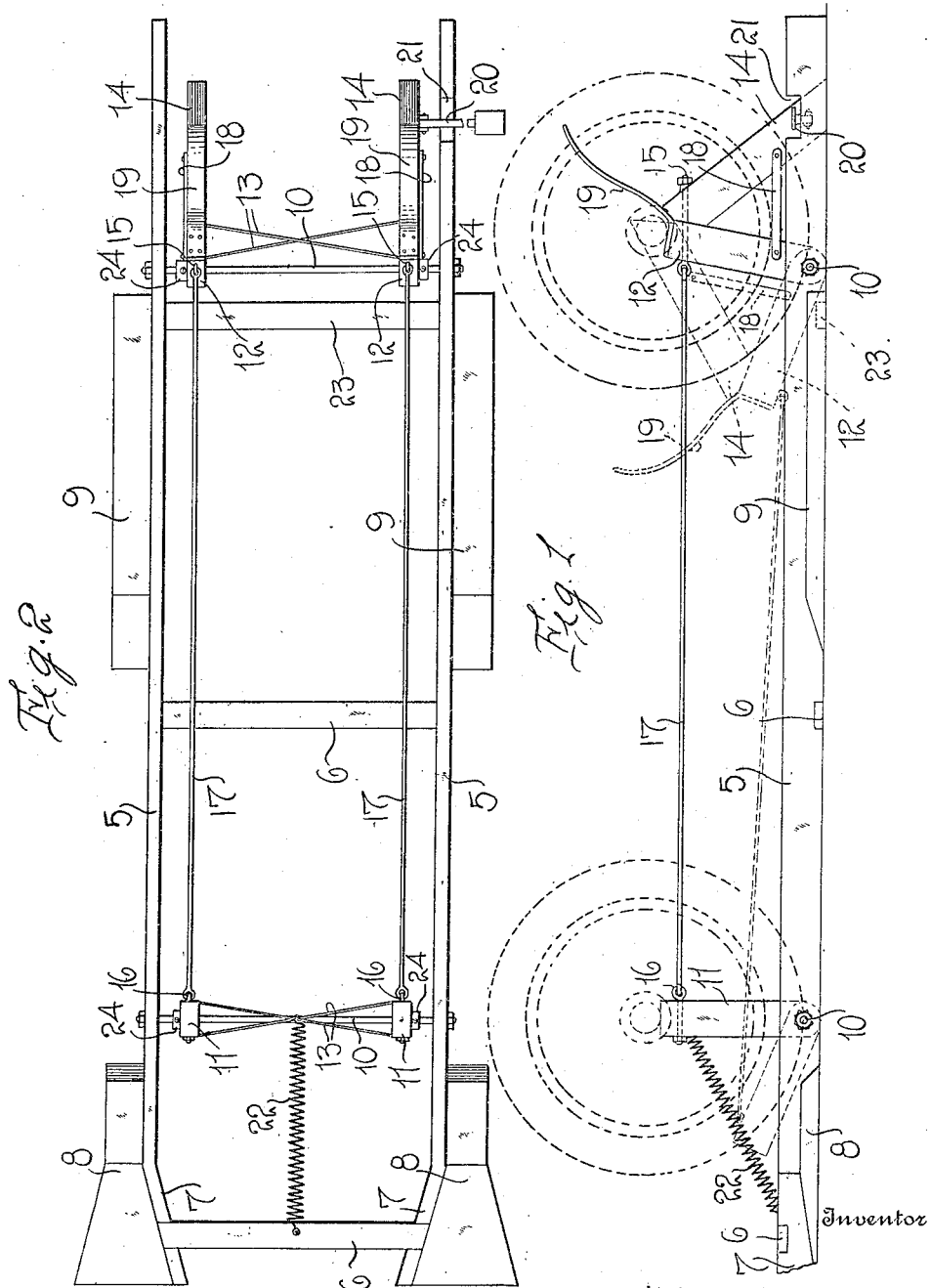

WILLIAM F. BOECKER, OF ADRIAN, MINNESOTA.

LIFTING-JACK.

1,227,873.  Specification of Letters Patent.  Patented May 29, 1917.

Application filed April 20, 1916. Serial No. 92,513.

*To all whom it may concern:*

Be it known that I, WILLIAM F. BOECKER, a citizen of the United States, residing at Adrian, in the county of Nobles and State of Minnesota, have invented certain new and useful Improvements in Lifting-Jacks, of which the following is a specification, reference being had to the accompanying drawings.

This invention relates to lifting jacks and more particularly to an automobile jack which is adapted to be automatically operated by the machine to lift the latter from the floor or ground.

It is the primary object of my invention to provide a lifting jack for the above purpose, which is simple and durable in its construction, will be positively actuated by the vehicle to lift or raise the same, and can be readily operated to lower the vehicle again upon the floor or ground.

It is one of the more particular objects of my invention to provide a vehicle lifting jack including pivotally mounted standards arranged in spaced pairs, means for operatively connecting the pairs of standards to each other, braces fixed to one pair of standards and adapted to engage the floor when the standards are in operative position, said latter pair of standards being provided upon their upper ends with means for engagement by the front wheel axle, means for yieldingly holding the connected pairs of standards in an inoperative position, and means connected to one of the braces adapted to be manually operated to lower the vehicle and engage the wheels thereof upon the ground.

With the above and other objects in view, my invention consists in the novel features of construction, combination and arrangement of parts to be hereinafter more fully described, claimed and illustrated in the accompanying drawing, in which, Figure 1 is a side elevation of an automobile jack constructed in accordance with the preferred embodiment of the invention, the pivoted standards being shown in dotted lines in their normal positions; and Fig. 2 is a top plan view.

Referring in detail to the drawing, 5 designates spaced, parallel sill bars which are connected together by a number of transverse bars 6. The sill bars 5, at one of their ends, are preferably inclined inwardly, as at 7, and to the outer faces of these ends of the bars the track rails 8 are suitably secured. To the outer face of each bar 5, adjacent its other end, a relatively long track rail 9 is secured.

The bars 5 are also connected together adjacent their opposite ends by the rods 10, and upon one of these rods the rear axle receiving standards 11 are pivotally mounted. The spaced standards 12 to receive and support the front axle of the machine, are pivotally mounted upon the other rod 10. These spaced standards 11 and 12 are connected together by intersecting brace rods 13.

To the upper ends of each of the standards 12, a forwardly and downwardly inclined brace bar or strut 14 is secured by means of the bolts 15. A similar bolt 16 is engaged in the upper end of each of the rear standards 11, and these bolts 15 and 16 in the corresponding standards 11 and 12 are connected together by a longitudinal rod 17. The respective standards 12 and the strut 14 are connected to each other by a horizontal brace bar 18. To the upper end of each standard 12, an upwardly projecting, curved arm 19 is secured at one of its ends and is adapted for engagement by the front axle of the vehicle. To the free end of one of the struts 14, a foot lever 20 is pivotally connected, and said lever, when the standards are in their operative positions, is adapted to project transversely through a notch or recess 21 in one of the sill bars 5 which provides a seat for said lever.

To the brace rods 13 connecting the rear spaced standards 11, one end of a spring 22 is attached, the other end of said spring being suitably fixed to the rear transverse connecting bar 6 between the sill bars 5. This spring normally acts to hold the standards 11 and 12 in their inoperative positions, as indicated in dotted lines in Fig. 1. This movement is limited by the front standards 12 engaging the transverse bar 23 connecting the sill bars 5. Upon each of the rods 10, stop collars 24 are secured by means of suitable set screws in engagement with the outer faces of the standards mounted upon said rod, to prevent longitudinal shifting movement of the standards on the rod.

From the foregoing description, taken in connection with the accompanying drawing, the construction, manner of operation and several advantages of the invention will be clearly and fully understood. Assuming that the parts are in the positions shown in dotted lines in Fig. 1, the vehicle is driven upon the tracks 8 which raise the forward end of the vehicle so that the front axle will safely pass over the rear standards 11. The front wheels then ride upon the track rails 9 and the front wheel axle strikes the upwardly projecting ends of the arms 19 and lifts the standards 12 to the full line position shown in Fig. 1 slightly past the perpendicular plane, at which time the ends of the truss members 14 engage upon the floor and prevent further pivotal movement of the standards. As these standards are forced upwardly, they engage against the under side of the front wheel axle and lift or elevate the same so that the wheels will be supported above and in spaced relation to the track rails 9. Through the medium of the connecting rods 17, the rear standards 11 are of course, simultaneously raised to the vertical position shown, so that they will engage against the underside of the rear wheel axle. The spring 22 is, of course, expanded and placed under tension. In this manner, it will be seen that the vehicle is quickly elevated so that the weight of the vehicle body will not rest upon the wheel tires.

When it is desired to lower the vehicle, pressure is brought to bear upon the foot lever 20, thus raising the lower end of the strut 14 to which the lever is connected, and thereby swinging the standards 12 and the vehicle rearwardly. As soon as the standards are disposed rearwardly of a perpendicular position, the weight of the vehicle and the contractile action of the spring 22 will continue the movement of the standards to their normal positions, thereby lowering the vehicle so that its wheels will again rest upon the ground. It is apparent that, by means of my invention, the manual labor incident to the jacking up of automobiles and similar vehicles is eliminated, as the operation is entirely automatic. The device is simple, durable in its construction, and may obviously be produced at small manufacturing cost.

While I have shown and described the preferred construction and arrangement of the several elements, it is to be understood that the device is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

A vehicle lifting jack including in combination with a frame, spaced pairs of standards pivotally mounted in said frame, connections between the corresponding standards to move the same in unison, means fixed to the upper ends of the front standards for engagement by the front axle of a vehicle to swing said standards past a perpendicular position and simultaneously raise the other pair of standards beneath the rear wheel axle, inclined braces fixed to the upper ends of the front standards, and a foot pedal pivotally mounted upon one of said braces in position to fulcrum upon the frame when the frame is in elevated position, whereby said front standards may be moved from their supporting positions to lower the vehicle.

In testimony whereof I hereunto affix my signature in the presence of two witnesses.

WILLIAM F. BOECKER.

Witnesses:
 JOSEPH L. LAIS,
 EMILIA M. MASGAI.

Copies of this patent may be obtained for five cents each, by addressing the "Commissioner of Patents, Washington, D. C."